US006962760B2

(12) United States Patent
Rice et al.

(10) Patent No.: US 6,962,760 B2
(45) Date of Patent: Nov. 8, 2005

(54) METHODS OF CONDITIONING DIRECT METHANOL FUEL CELLS

(75) Inventors: Cynthia Rice, Newington, CT (US); Xiaoming Ren, Menands, NY (US); Shimshon Gottesfeld, Niskayuna, NY (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 10/460,452

(22) Filed: Jun. 12, 2003

(65) Prior Publication Data

US 2004/0191584 A1 Sep. 30, 2004

Related U.S. Application Data

(60) Provisional application No. 60/457,390, filed on Mar. 25, 2003.

(51) Int. Cl.[7] ............................ H01M 8/00; H01M 8/10

(52) U.S. Cl. .............................. 429/13; 429/30; 429/40

(58) Field of Search ............................... 429/13, 30, 40

(56) References Cited

U.S. PATENT DOCUMENTS 5,415,888 A 5/1995 Banerjee ..................... 427/125

2004/0185328 A1 * 9/2004 Lin et al. ...................... 429/50

* cited by examiner

*Primary Examiner*—Patrick Joseph Ryan
*Assistant Examiner*—Angela J. Martin
(74) *Attorney, Agent, or Firm*—Ray G. Wilson

(57) ABSTRACT

Methods for conditioning the membrane electrode assembly of a direct methanol fuel cell ("DMFC") are disclosed. In a first method, an electrical current of polarity opposite to that used in a functioning direct methanol fuel cell is passed through the anode surface of the membrane electrode assembly. In a second method, methanol is supplied to an anode surface of the membrane electrode assembly, allowed to cross over the polymer electrolyte membrane of the membrane electrode assembly to a cathode surface of the membrane electrode assembly, and an electrical current of polarity opposite to that in a functioning direct methanol fuel cell is drawn through the membrane electrode assembly, wherein methanol is oxidized at the cathode surface of the membrane electrode assembly while the catalyst on the anode surface is reduced. Surface oxides on the direct methanol fuel cell anode catalyst of the membrane electrode assembly are thereby reduced.

14 Claims, 5 Drawing Sheets

METHODS OF CONDITIONING DIRECT METHANOL FUEL CELLS

RELATED APPLICATIONS

This application claims the benefit of U.S. Provisional Application 60/457,390, filed Mar. 25, 2003.

GOVERNMENT RIGHTS

This invention was made with Government support under Contract Number W-7405-ENG-36 awarded by the United States Department of Energy to The Regents of the University of California. The Government has certain rights in the invention.

BACKGROUND OF THE INVENTION

1. Field of the Invention

The present invention relates to the preparation of direct methanol fuel cells. More specifically, the present invention relates to methods for conditioning the catalysts used in the membrane electrode assembly of direct methanol fuel cells to reduce the amount of surface oxides, and thus improve the electrooxidative activity of the membrane electrode assembly.

2. Description of Related Art

Production of sufficient electrical power to meet the needs of a growing population and economy is a constant challenge. In view of limitations on traditional electric power production, there is increased interest in alternative means of producing electricity.

One technology that has evoked increasing excitement in the area of alternate energy sources in recent years is the fuel cell. Fuel cells are devices that generate electricity directly from chemical energy. Fuel cells are structurally similar to some batteries, having an anode, a cathode, and an electrolyte. Unlike batteries, however, fuel cells are supplied with a continuous stream of fuel and oxidant. The fuel is supplied to the anode, and the oxidant is supplied to the cathode. The fuel and oxidant are electrochemically combined, thus releasing electrical energy, which is available for use.

Fuel cell electrodes often comprise a porous electrically conductive substrate on which an electrocatalyst is deposited. In many newer fuel cells, the electrolyte is often a solid polymer to which the electrodes are attached, thus forming a membrane electrode assembly. The electrolyte used may be a solid polymer electrolyte, also referred to as an ion exchange membrane, disposed between the two electrode layers. Flow field plates for directing the reactants across a surface of each electrode may also be included in the membrane electrode assembly.

Many types of electrocatalysts may be used on the electrodes of the fuel cell, including metal blacks, metal alloy blacks, or supported metal catalysts. Electrocatalysts such as these are generally attached to the electrode as a layer applied to either an electrode substrate or to the membrane electrolyte itself. The electrocatalyst may be applied by mixing fine electrocatalyst particles with a liquid, thus forming an ink, which is then applied to the substrate. This ink preferably wets the substrate surface, but does not penetrate too deeply, so as to keep as much catalyst as possible at the interface between the electrolyte and the electrode.

Proper application of electrocatalyst renders it accessible to reactants, electrically connected to current collectors associated with the fuel cell, and ionically connected to the electrolyte. In operation, electrons and protons are generated at the electrocatalyst of the anode. From here, the electrons are channeled through the current collectors to an external circuit, thus producing a useful electric current. The protons, meanwhile, are conducted through the electrolyte to the cathode of the fuel cell.

The mechanism of energy production seen in fuel cells sets them apart from other energy production technologies in that it provides a very efficient, clean, and quiet source of energy. Specifically, since fuel cells effectively convert chemical energy to electricity, without the intermediate steps of conversion to heat and subsequent conversion to mechanical energy common to most energy production methods, efficiency is increased. This is due to the fact that conversion of heat to mechanical energy is associated with limited efficiency. Further, since no combustion takes place in the energy conversion process in a fuel cell, the chemical products of the fuel cell can be more accurately predicted and carefully chosen. Indeed, in many fuel cell designs, the main product of the reaction is selected to be water vapor.

Electrochemical fuel cell performance may be judged by the voltage output from the cell for a given current density. Higher cell performance is correlated with a higher voltage output for a given current density or higher current density for a given voltage output. Substantial improvement in the performance of a fuel cell may be obtained by improving the utilization of the electrocatalyst. By doing so, the same amount of electrocatalyst may cause a much higher rate of chemical conversion, thus improving the efficiency of the fuel cell.

Several substantial barriers stand in the way of full-scale implementation of fuel cells as the power supply for homes, automobiles, and businesses. First, fuel cells are currently expensive when compared with traditional energy sources. Furthermore, there is no ready infrastructure for supplying fuel to fuel cell devices. Additionally, many engineering and safety difficulties must still be fully resolved before regulators will permit fuel cells to be used to power automobiles and other vehicles.

Some of the engineering and safety issues are faced in connection with the use of hydrogen as a fuel for the devices. Others are faced during the construction/preparation of the fuel cells themselves. Hydrogen is difficult to store, especially in vehicles. As a result, efforts have progressed to develop fuel cells capable of operating on alternative fuels which either may be reformed to provide hydrogen, or which may be used directly. Additionally, the use of hydrogen in fuel cell fabrication endangers workers and production facilities. It is thus desirable to provide production methods which do not require the use of hydrogen gas, thus sparing added expense and rendering the production process much more safe.

Direct methanol fuel cells ("DMFCs") are fuel cells that operate by directly electrochemically oxidizing methanol at an anode electrocatalyst. This anode reaction produces carbon dioxide, protons, and electrons. This type of fuel cell has begun to gain popularity since it does not require the use of gaseous hydrogen as a fuel. In the reaction, the electrons are channeled from the anode, where they are produced, through a circuit external to the fuel cell, to the cathode electrocatalyst. At the cathode, electrons recombine with protons and oxygen to form water. As noted above, often in such fuel cells, the electrolyte is a polymer electrolyte membrane. These membranes allow larger convenience in fuel cell design and enable operation with distilled water as the only liquid in the cell, other than the fuel itself.

Direct methanol fuel cells are an improvement over the current art in that they are capable of using methanol as a fuel instead of gaseous hydrogen. Further, the methanol may be used directly without first being processed in a reformer to generate the needed hydrogen. This eliminates the added weight and expense that a reformer adds to a design.

In addition, as noted above, hydrogen may be required in the manufacturing of fuel cells, including direct methanol fuel cells. One example of this is the use of hydrogen in conditioning the electrocatalysts of a direct methanol fuel cell, especially at the anode. This conditioning step is included to facilitate the reduction of any surface oxides found on the electrode. It has been discovered that fuel cell efficiency is increased when the platinum/ruthenium (PtRu) anode catalyst is conditioned to remove surface oxides as much as possible. Specifically, x-ray photoelectron spectroscopy (XPS) demonstrated that an increased metallic content of the Pt/Ru catalyst aids in methanol electrooxidation activity. Wieckowski et al., *J. New Mat. Electrochem. Systems*, 3:275–284 (2000).

A current laboratory method of conditioning the membrane electrode assemblies (or "MEAs") used in direct methanol fuel cells involves flowing hydrogen gas over the anode side of the MEA at elevated cell temperatures (such as 80° C.). During this process, the cell voltage is held at 0.6 V until the current reaches a steady state. Oxides at the anode surface are reduced by the hydrogen gas, thus rendering a more active electrocatalyst.

As briefly noted above, however, hydrogen gas is hazardous. Its use requires precautions that may be cost prohibitive, while still remaining a potential danger to employees and a liability to manufacturers. As a result, it would be an improvement in the art to provide alternative conditioning procedures, which improve the electrocatalytic function of the membrane electrode assembly of a direct methanol fuel cell without dependency on gaseous hydrogen.

Accordingly, a need exists for methods of conditioning the PtRu anode of direct methanol fuel cells, which do not use hydrogen gas, but which effectively and efficiently reduce surface oxides found at the Pt/Ru anode, thus increasing the activity and/or efficiency of the direct methanol fuel cell. In accordance with the present invention, n addition to the beneficial effects of effective reduction of the DMFC anode catalyst as conditioning at the beginning of cell operation, in-situ reduction of the anode catalyst surface can also be beneficial as DMFC conditioning step following long-term DMFC cell operation. Long term DMFC performance decay can be caused by a higher state of surface oxidation of the PtRu anode catalyst, gradually developing during cell operation as the anode experiences higher potentials. Brief application of effective anode surface reduction in-situ conditioning will enable cell performance recovery.

SUMMARY OF THE INVENTION

The apparatus of the present invention has been developed in response to the present state of the art, and in particular, in response to the problems and needs in the art that have not yet been fully solved by currently available methods of conditioning the electrocatalysts of direct methanol fuel cells. Thus, it is an overall objective of the present invention to provide alternative methods of conditioning the membrane electrocatalysts of direct methanol fuel cells that do not require the use of gaseous hydrogen.

To achieve the foregoing objective, and in accordance with the invention as embodied and broadly described herein in the preferred embodiment, methods of conditioning a membrane electrode assembly of a direct methanol fuel cell are provided. In a method of the invention, a current of polarity opposite that used in an operating direct methanol fuel cell is passed through a membrane electrode assembly, thus electrochemically generating hydrogen at the PtRu electrocatalyst and reducing surface oxides found there. The methods of the invention may be useful with a variety of Pt alloys having oxophilic elements including, but not limited to: $PtRuO_5$, PtMo, etc. In an alternative method of the invention, a voltage is applied to a cell having the same polarity as an operating direct methanol fuel cell, in which methanol crossover has been encouraged to generate current of reversed polarity. The resulting oxidation of the methanol at the Pt cathode catalyst causes production of hydrogen at the PtRu anode catalyst. The hydrogen then reduces surface oxides on the PtRu electrocatalyst. In methods of the invention, the conditioning currents are applied for periods of time of from about 1 minute to about 120 minutes. The present invention eliminates the need to use gaseous hydrogen in a conditioning step of membrane electrode assembly manufacturing, thus providing benefits in the fabrication and use of direct methanol fuel cells.

A first version of the conditioning method of the invention, referred to as "current conditioning," comprises several steps. In a first step, methanol is supplied to the first surface of the membrane electrode assembly. This first surface is the electrocatalytic surface intended for use as the anode in a functioning fuel cell. In preferred methods, as noted above, this surface is the PtRu electrode. In a second step, air is supplied to a second surface of the membrane electrode assembly. This second surface is the electrocatalytic surface intended for use as the cathode in a functioning fuel cell. In preferred methods, this surface is a Pt electrode. In a final step, an electrical current is drawn through the first surface of the membrane electrode assembly. The resulting flow of current is opposite that in a functioning fuel cell. As a result of this, hydrogen is generated at the PtRu electrode and surface oxides present on the PtRu surface are reduced. As noted above, this method is preferably practiced with a first surface comprising a platinum-ruthenium electrocatalyst, and a second surface comprising a platinum electrocatalyst. In variations of this method, the temperature of the cell used is raised, and the methanol and air supplied to the surfaces of the membrane electrode assembly are heated. The current may be applied for a period of time of from about 15 to about 120 minutes.

Another alternative method of conditioning the membrane electrode assembly of a direct methanol fuel cell is referred to as "crossover assisted current conditioning." Crossover assisted current conditioning takes advantage of a problem encountered in direct methanol fuel cells known as methanol crossover. Methanol crossover describes the condition of having methanol supplied to the anode of a fuel cell cross the polymer electrolyte membrane of the membrane electrode assembly to reach the cathode side of the MEA.

In this method, a first step may comprise supplying methanol to a first surface of the membrane electrode assembly. This first surface should be intended for use as a fuel cell anode. In a second step, the methanol supplied to the first surface is allowed to cross over the polymer electrolyte membrane of the membrane electrode assembly to a second surface of the membrane electrode assembly. The second surface should be intended for use as a fuel cell cathode. Finally, an electrical current is drawn with polarity opposite to that in an operating direct methanol fuel cell. This causes the methanol present at the second surface following crossover to be oxidized at the second surface of the membrane electrode assembly.

In crossover assisted current conditioning, as in current conditioning, the first surface preferably comprises a platinum-ruthenium electrocatalyst, and the second surface preferably comprises a platinum electrocatalyst. As with current conditioning, in variations of the invention the temperature of the cell used is raised, and the methanol and air supplied to the surfaces of the membrane electrode assembly are heated. The current may be applied for a period of time of from about 15 to about 120 minutes.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings and the detailed description of the invention. It will be readily understood that the component steps of the present invention, as generally described could be varied within the scope of the invention. Thus, the following more detailed description of the embodiments of the method of the present invention, as represented in FIGS. 1 through 5, is not intended to limit the scope of the invention, as claimed, but is merely representative of presently preferred embodiments of the invention.

Figure 1:
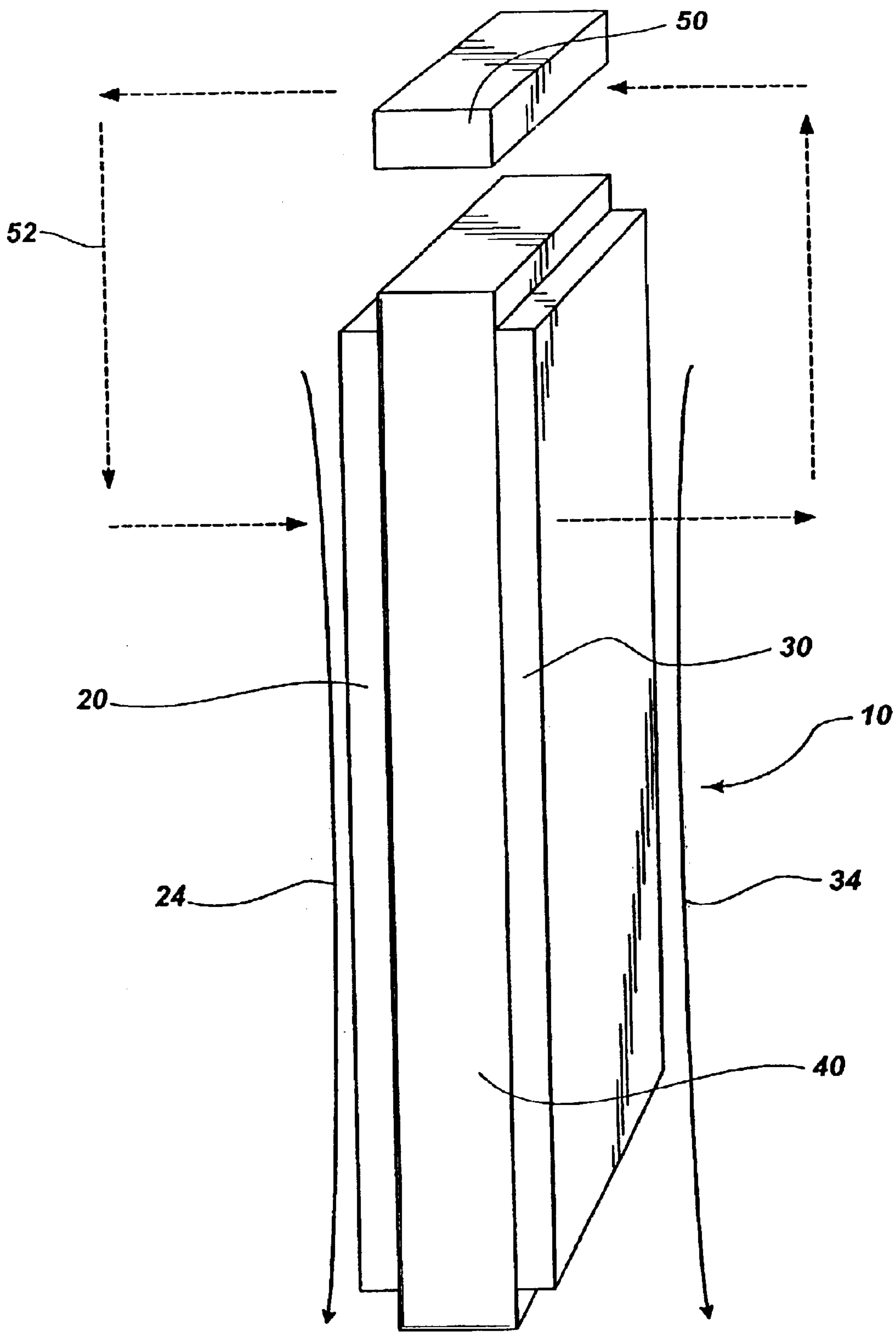
FIG. 1 is a schematic view of a membrane electrode assembly upon which the current conditioning method of the invention is being practiced.
Figure 2:
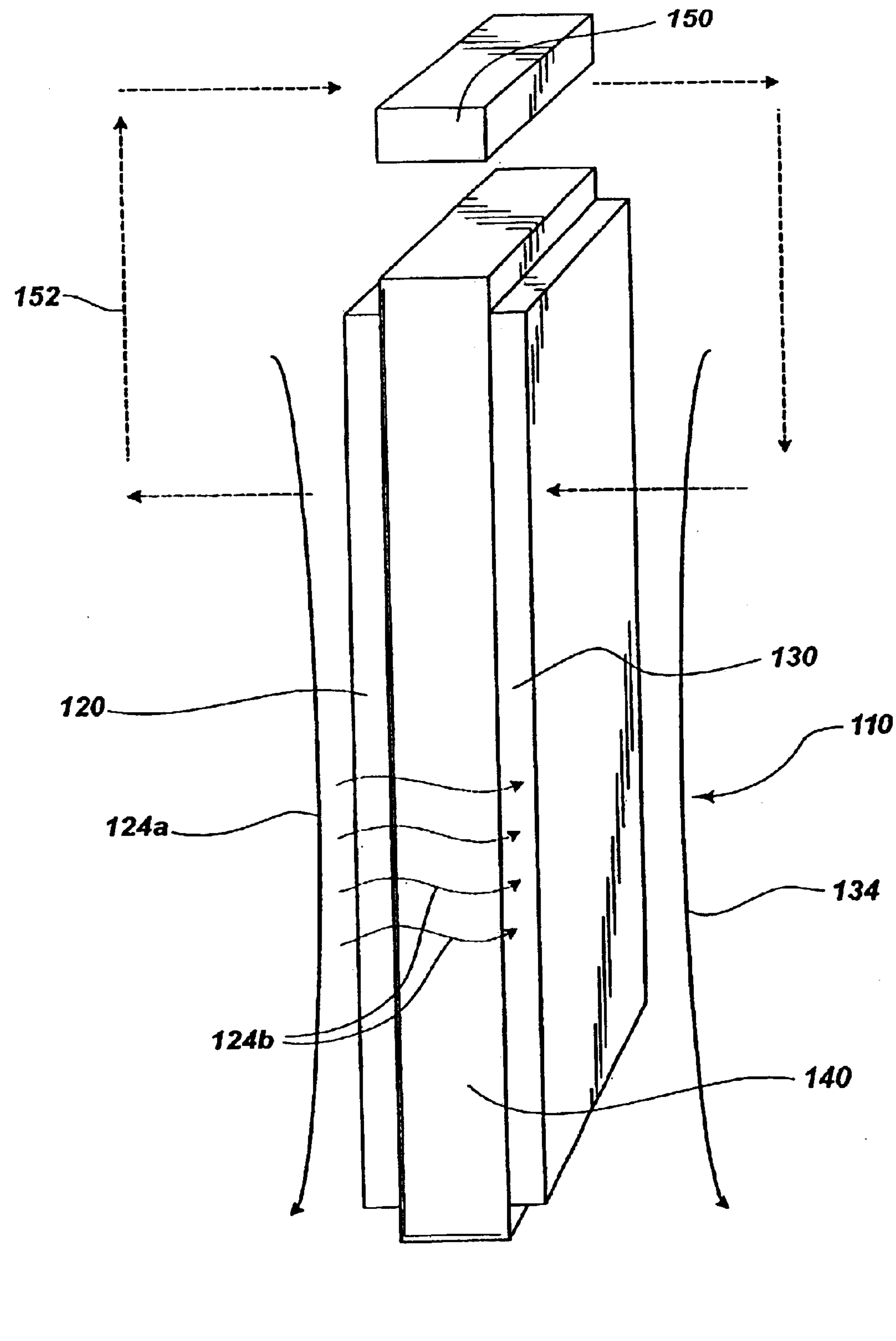
FIG. 2 is a schematic view of a membrane electrode assembly upon which the crossover-assisted current conditioning method of the invention is being practiced.

Referring now to the figures accompanying this application, FIG. 1 is a schematic view of a membrane electrode assembly upon which the current conditioning method of the present invention is being practiced. FIG. 2 is a schematic view of a membrane electrode assembly upon which the crossover-assisted current conditioning method of the present invention is being practiced. These figures will be discussed in detail below.

As noted above, FIG. 1 is a schematic view of a membrane electrode assembly upon which the current conditioning method of the invention is being practiced. Specifically, FIG. 1 shows a membrane electrode assembly 10 of the invention. In this method of the invention, current is passed through the cell by an external power source 50 with the polarity of the electrodes 20 and 30 reversed, such that the platinum electrode 30, which is normally the cathode in a functioning fuel cell, becomes the anode. As a result of this, the platinum-ruthenium electrode 20, set as the anode in a functioning fuel cell, functions as the cathode. As in a functional membrane electrode assembly such as 10, the electrodes 20, 30 are separated from each other by a polymer electrode membrane 40.

According to the remaining steps of this method of the invention, the temperature of the conditioning system is raised to speed the reactions at the electrodes. The temperature of the cell is generally raised to a level of from about 20° C. to about 110° C. More preferably, the cell is raised to a temperature of from about 60° C. to about 100° C. Most preferably, the cell is raised to a temperature of about 80° C. During the conditioning, methanol 24 can be supplied to the PtRu electrode 20 and air 34 bubbled over the Pt electrode 30. As in an operating direct methanol fuel cell, these fuel flows 24, 34 are provided continuously over the surfaces of the electrodes 20, 30. As a result of passing the current of reverse polarity, hydrogen is generated at the PtRu electrode 20, and reduces surface oxides present on the PtRu electrode 20.

The current applied to the PtRu electrode 20 may be any of a range of useful currents ranging from about 100 $mA/cm^2$ to about 1000 $mA/cm^2$. In more preferred embodiments, the current is 350 mA (100 $mA/cm^2$) to about 700 mA (200 $mA/cm^2$) used with an electrode surface area of 3.5 $cm^2$. Still more preferably, the current may be from about 425 mA (121 $mA/cm^2$) to about 575 mA (164 $mA/cm^2$). In most preferred embodiments of the method of the invention, the current is about 500 mA.

The current may be applied from a period of time ranging from about one minute to about 120 minutes in length. More preferably, the current is applied for a period of time of from about 15 minutes to about 60 minutes.

Referring now to FIG. 2, a schematic view of a membrane electrode assembly upon which the crossover-assisted current conditioning method of the invention is being performed is shown. Specifically, FIG. 2 shows a membrane electrode assembly 110 of the invention. In this crossover-assisted current conditioning of the invention, current 152 is drawn from the external power source 150 while methanol **124*b* is allowed to cross over from the PtRu electrode 120 to the Pt electrode 130. Conditioning is achieved as current 152 is passed through the cell by external power supply 150. The methanol 124*b* is consequently oxidized at the Pt electrode 130, and surface oxides at the PtRu electrode are reduced. As in a functional membrane electrode assembly such as 110 of the invention, a polymer electrode membrane 140 separates the electrodes 120, 130** from each other.

Methanol **124*a* is supplied to the PtRu electrode 120 and air 134 may be bubbled over the Pt electrode 130 during the passage of the reverse current, as in an operating direct methanol fuel cell. The fuel flows 124*a*, 134 are provided continuously over the surfaces of the electrodes 120, 130**.

The voltage applied to the membrane electrode assembly 110 may be any of a range of from about 0.2 V (0.057 V/cm$^2$) to about 1.6 V (0.46 V/cm$^2$). In more preferred embodiments, the voltage may be from about 0.6 V (0.17 V/cm$^2$) to about 1.0 V (0.28 V/cm$^2$). In presently preferred embodiments of the method of the invention, the voltage is about 0.8 V (0.22 V/cm$^2$). Further, the cell temperature may be raised to increase reaction speed.

The current may be applied from a period of time ranging from about one minute to about 120 minutes in length. More preferably, the current is applied for a period of time of from about 15 minutes to about 60 minutes.

In preferred embodiments of the invention, the cell temperature may be raised to about 80° C. At the electrodes of the invention, the methanol 124 may be supplied at a rate of about 1 mL/min, and may be about 3 M in concentration. Higher concentrations of methanol **124*a* such as 17 M may be used in the crossover-assisted current conditioning method in order to encourage movement of the methanol 124*a* across the membrane 140, thus becoming methanol 124*b* available for reaction at the Pt electrode 130 to provide a higher current, and thus a higher hydrogen evolution rate at the PtRu fuel cell anode of the membrane electrode assembly at a chosen voltage (for example, 0.6 V) applied to the cell. In some alternative configurations of the invention, air 134 may be supplied to the Pt electrode 130**. In some configurations, this is done at about 470 standard cubic centimeters per minute. This air may have a backpressure of about 30 psi, and may be provided at a temperature of about 90° C.

A need exists in the art of fuel cell fabrication for improvements to methods of conditioning the electrocatalysts of the fuel cell electrodes such as the platinum-ruthenium anodes of the membrane electrode assemblies used in direct methanol fuel cells. Currently, those conditioning methods that are considered to be most effective use gaseous hydrogen. The invention disclosed herein teaches novel methods of conditioning the membrane electron assemblies which significantly enhance the performance of direct methanol fuel cells over the performance observed in non-conditioned membrane electrode assemblies and do not require hydrogen gas.

The "current conditioning" and "crossover assisted current conditioning" methods of the invention condition the platinum-ruthenium anodes of the membrane electrode assemblies of direct methanol fuel cells by reducing surface oxides present on the platinum-ruthenium electrocatalyst of the platinum-ruthenium electrode. These methods provide viable alternatives to the gaseous hydrogen conditioning methods. These methods may be used to avert additional cost and possible dangers associated with the use of gaseous hydrogen in manufacturing methods.

The "current conditioning" approach described can be also well applied for recovering the performance of a DMFC that has suffered long term performance decay as a result of reestablishment of higher states of surface oxidation on the anode catalyst. Application of reversed current can then recover the loss in cell performance. The treatment is very simple, requiring only connection of a current source to the leads of the DMFC. As an example, in a hybrid power system involving a DMFC and battery combination, the battery could serve temporarily as the current source for DMFC catalyst (and cell) rejuvenation.

The methods of the present invention may be varied within the scope of the invention without departing from it. The described embodiments are to be considered in all respects only as illustrative, and not restrictive, since the methods and their essential characteristics as broadly described herein and claimed hereinafter may be varied within the scope of the invention. The scope of the invention is, therefore, indicated by the appended claims, rather than by the foregoing description. All changes that come within the meaning and range of equivalency of the claims are to be embraced within their scope.

EXAMPLES

Example 1

In a first example, a membrane electrode assembly with an active area of 3.5 cm$^2$ was conditioned using the current conditioning method of the instant invention. As explained above, the PtRu anode of the membrane electrode assembly was set as the cathode in the cell, and the Pt electrode was set as the anode as current was passed from an external power supply. During the passage of current, the cell temperature was raised to 80° C. Fuel and oxidant were then supplied in streams to the electrodes of the membrane electrode assembly as in the ordinary operation of a direct methanol fuel cell. Specifically, the surface of the PtRu electrode was supplied with 1M methanol at a rate of about 1 mL/min, while the Pt electrode was supplied with air at a rate of 41 standard cubic centimeters per minute at 30 psi and 90° C. As a result of the reverse current passed, hydrogen was generated at the PtRu electrocatalyst. This hydrogen then reacted with surface oxides present in the PtRu electrode, reducing them and thereby conditioning the electrode.

In this set of experiments, three different current levels were applied for time intervals of about one hour at each current. Specifically, conditioning tests were conducted at current levels of 350 mA, 500 mA, and 700 mA. The same membrane electrode assembly was used for each iteration of the experiment. In each of these, the membrane electrode assembly had an active surface area of 3.5 cm$^2$. The conditioning currents used were passed in consecutive order, and the cell temperature was allowed to return to 28° C. in-between each iteration of the conditioning method.

Following each iteration, the newly conditioned membrane electrode assembly was tested at 28° C. in fuel cell mode. Specifically, each conditioned membrane electrode assembly was tested in a fuel cell fed with 0.5 M methanol flowing at 0.5 mL/min and with air flowing at 41 standard cubic centimeters per minute. The air supplied was provided without backpressure or humidification. Between the iterations, testing which included cell polarization curves, anode polarization curves, and CO stripping cyclic voltametric measurements was conducted.

Figure 3:
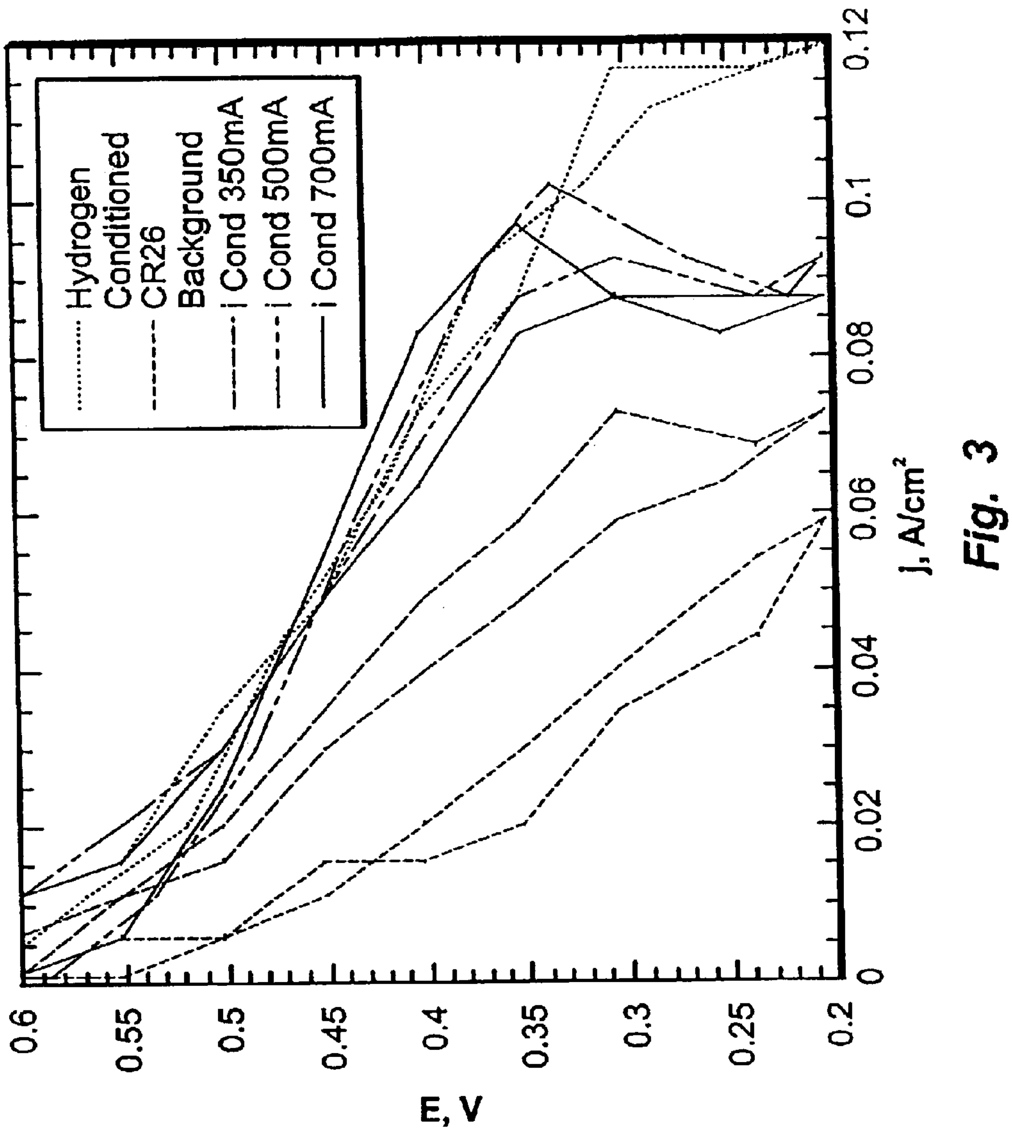
FIG. 3 is a graph showing the direct methanol fuel cell polarization curves from a conditioned direct methanol fuel cell using a hydrogen-conditioned membrane electrode assembly and several current-conditioned membrane electrode assemblies conditioned at increasing current loads.

FIG. 3 shows the polarization curves measured for the methanol/air fuel cell after conditioning the membrane electrode assembly for each of the currents listed above for an hour. It is seen that under the testing conditions described above, current conditioning at 500 mA appears to be optimal. The vi-curve shows no appreciable difference between the 500 mA-conditioned and 700 mA-conditioned membrane electrode assemblies. When possible, higher currents are avoided in the methods of the invention since higher currents may be detrimental to the Pt electrode side of the membrane electrode assembly. Specifically, high currents have been known to potentially cause degradation of the electrode's backing layer that is made of carbon cloth.

Example 2

In a second example, a membrane electrode assembly was conditioned using the crossover assisted current conditioning method of the invention. As explained above, the cell temperature was raised to 80° C. Fuel and oxidant were supplied to the PtRu fuel cell anode electrode of the membrane electrode assembly. In some cases, it is desirable to limit oxygen from air reaching the Pt fuel cell cathode of the membrane electrode assembly. In these, the fuel cell cathode inlet is closed, while the fuel cell cathode outlet remains open to vent the CO2 produced during the conditioning process. Alternatively, the fuel cell cathode chamber can be filled with D. I. water.

In some cases, it is desirable to prevent oxygen from air reaching the Pt fuel cell cathode of the membrane electrode assembly. In these, the fuel cell cathode inlet is closed, while the fuel cell cathode outlet remains open to vent the CO2 produced during the conditioning process. Alternatively, the fuel cell cathode chamber can be filled with D. I. water. In still other alternatives, it is not desirable for oxygen to be prevented from contacting the cathode. In these, the fuel cell cathode inlet may be opened, and the fuel cell cathode outlet may also be allowed to remain open to release CO2 produced during the conditioning process.

In these various methods, 3M methanol was passed over the surface of the PtRu anode at a rate of about 1 mL/min. The Pt cathode was supplied with air at a rate of about 470 standard cubic centimeters per minute under 30 psi of back pressure and humidified at a temperature of 90° C. Following these initial steps, a voltage of 0.8 V was applied to the cell from an external power supply for 2 hours, with the PtRu electrode serving as cathode and the Pt electrode as anode.

Example 3

In a third example, a membrane electrode assembly was conditioned using the crossover assisted current conditioning method of the invention. As explained above, the cell temperature was raised to 80° C. Fuel was supplied to the PtRu fuel cell anode electrode of the membrane electrode assembly, while the fuel cell cathode was fed with D.I. water, and the fuel cell cathode outlet remained open for releasing $CO_2$ produced during conditioning process. Specifically, 3M methanol was passed over the surface of the PtRu anode at a rate of about 1 mL/min. The Pt cathode was supplied with air at a rate of about 470 standard cubic centimeters per minute under 30 psi of back pressure and humidified at a temperature of 90° C. Following these initial steps, a voltage having the same polarity as an operating direct methanol fuel cell of 0.8 V was applied to the cell from an external power supply for 2 hours, with the PtRu electrode serving as cathode and the Pt electrode as anode.

Under the conditions of examples 2 and 3, the crossover of methanol from the PtRu anode electrode through the membrane to the Pt cathode electrode is encouraged. As a result of this, a significant amount of methanol is expected to be found at the cathode. Under the voltage of about 0.8 V applied in either the absence, or alternatively, the presence of oxygen at the Pt fuel cell cathode of the membrane electrode assembly, the methanol is electrochemically oxidized at the Pt electrode (instead of water or carbon in the current conditioning method), and during the conditioning step, surface oxides on the fuel cell anode catalyst are reduced by electrochemically generated $H_2$.

In this method, a membrane electrode assembly identical to that used in Example 1 was used. Specifically, the membrane electrode assembly had a PtRu anode and a Pt cathode, each having an active surface area of 3.5 $cm^2$.

Next, as in Example 1, the newly conditioned membrane electrode assembly was tested for direct methanol fuel cell performance at 28° C. Specifically, the membrane electrode assembly was tested in a fuel cell fed with 0.5 M methanol flowing at 0.5 mL/min and with air flowing at 41 standard cubic centimeters per minute. The air supplied was provided without backpressure and humidification. The temperature of the cell was allowed to drop to 28° C. Between the iterations, testing including polarization curves, anode polarization curves, and CO stripping cyclic voltametric measurements was conducted.

Figure 4:
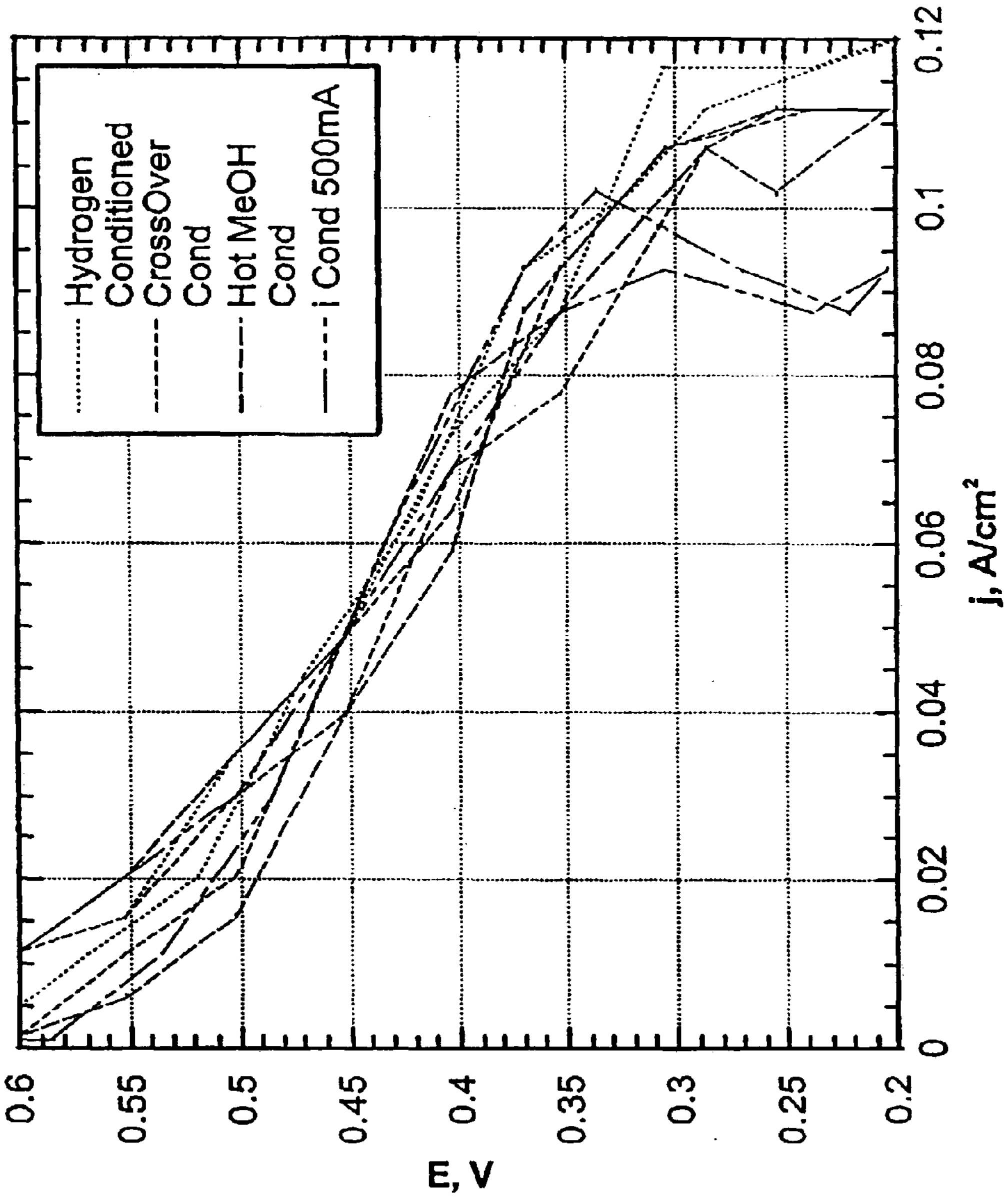
FIG. 4 is a graph showing direct methanol fuel cell polarization curves for hydrogen-, crossover assisted current-, hot methanol-, and current-conditioned membrane electrode assemblies used in a direct methanol fuel cell.

The results of this experiment are shown in FIG. 4 in the form of cell polarization curves. In FIG. 4, the polarization curve of the crossover assisted current-conditioned membrane electrode assembly is compared with those of a membrane electrode assembly conditioned by current conditioning and two membrane electrode assemblies conditioned using methods currently used in the art: hydrogen conditioning and hot methanol conditioning. These polarization curves were obtained under the testing conditions noted above: 0.5 M methanol run over the PtRu anode surface at a rate of about 0.5 mL/min, 41 standard cubic centimeters per minute of air run over the Pt cathode surface without backpressure or humidification, and a cell temperature of 28° C. during the test. These are conditions that commonly apply to so-called "air-breathing" direct methanol fuel cells that operate very near ambient temperature and pressure with no active flow of air.

Example 3

Figure 5:
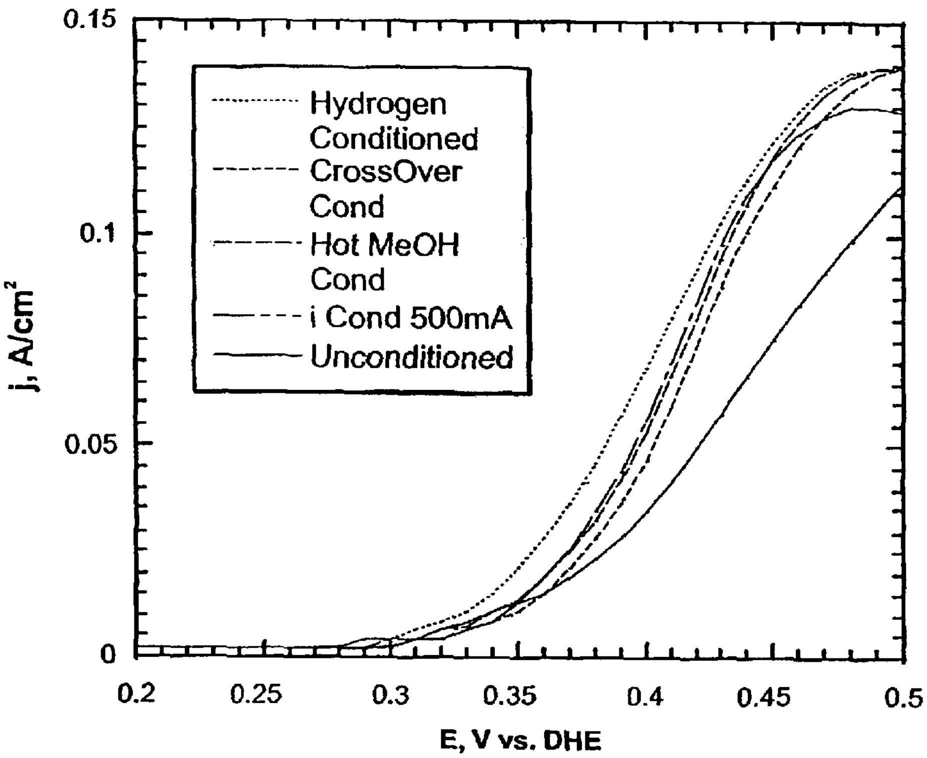
FIG. 5 is a graph showing PtRu anode polarization curves for hydrogen-, crossover assisted current-, hot methanol-, and current-conditioned membrane electrode assemblies relative to an unconditioned membrane electrode assembly.

Finally, anode polarization curves were measured for three differently-conditioned membrane electrode assemblies and compared to a hydrogen conditioned membrane electrode assembly. These curves are shown in FIG. 5. In taking these anode polarization measurements, the cathode of the membrane electrode assembly was transformed into a dynamic hydrogen reference electrode ("DHE") by flowing a stream of hydrogen over it at 112 standard cubic centimeters per minute under 10 psi of backpressure prehumidified at 32° C. At the same time, 0.5 M methanol was passed over the anode at 0.5 mL/min.

As is seen in FIG. 5, the hydrogen-conditioned anode exhibits the highest current density. The crossover assisted current conditioned membrane electrode assembly, in contrast, exhibits the lowest current density. Further, the hot methanol-conditioned and current-conditioned membrane electrode assemblies appeared to have very similar activity levels. Without being limited to any one theory, the variation seen in the activity of the variously conditioned membrane electrode assemblies may be related to their ability to reduce surface oxides and/or enhance alloying of the metals in the anode catalyst. It was observed, however, that every conditioning method functions to significantly increase the activity of the membrane electrode assembly when compared to the activity observed at an untreated membrane electrode assembly. More complete activation by current could possibly be achieved by longer periods of current passage through the cell.

What is claimed is:

1. A method of conditioning a membrane electrode assembly of a direct methanol fuel cell comprising the steps of:

supplying methanol to a first surface of the membrane electrode assembly, said first surface intended for use as a fuel cell anode;

supplying air to a second surface of the membrane electrode assembly, said second surface intended for use as a fuel cell cathode; and drawing an electrical current of polarity reversed to that used in a functioning direct methanol fuel cell through the membrane electrode assembly; wherein surface oxides present on the first surface are reduced.

2. The method of claim 1, wherein the first surface comprises a platinum-ruthenium electrocatalyst.

3. The method of claim 2, wherein the second surface comprises a platinum electrocatalyst.

4. The method of claim 1, wherein the method further comprises the step of raising the temperature of the membrane electrode assembly to a temperature of from about 20° C. to about 100° C. during passage of the conditioning current.

5. The method of claim 4, wherein the step of raising the temperature of the membrane electrode assembly comprises raising the temperature of the membrane electrode assembly to a temperature of from about 70° C. to about 90° C.

6. The method of claim 5, wherein the step of raising the temperature of the membrane assembly comprises raising the temperature of the membrane electrode assembly to a temperature of about 80° C.

7. The method of claim 1, wherein the step of drawing an electrical current of polarity reversed to that used in a functioning direct methanol fuel cell through the membrane electrode assembly comprises drawing a current of from about 100 $mA/cm^2$ to about 200 $mA/cm^2$ through the membrane electrode assembly.

8. The method of claim 7, wherein the step of drawing an electrical current of polarity reversed to that used in a functioning direct methanol fuel cell through the membrane electrode assembly comprises drawing a current of from about 120 $mA/cm^2$ to about 180 $mA/cm^2$ through the membrane electrode assembly.

9. The method of claim 8, wherein the step of drawing an electrical current of polarity reversed to that used in a functioning direct methanol fuel cell through the membrane electrode assembly comprises drawing a current of 150 $mA/cm^2$ through the membrane electrode assembly.

10. The method of claim 1, wherein the methanol is about 1 M.

11. The method of claim 1, wherein the step of drawing an electrical current of polarity reversed to that used in a functioning direct methanol fuel cell through the membrane electrode assembly is applied for a period of from about 1 minute to about 120 minutes in length.

12. The method of claim 1, wherein the step of drawing an electrical current of polarity reversed to that used in a functioning direct methanol fuel cell through the membrane electrode assembly is applied for a period of from about 15 minutes to about 60 minutes in length.

13. A method of conditioning a membrane electrode assembly of a direct methanol fuel cell comprising the steps of:

supplying methanol to a first surface of the membrane electrode assembly, said first surface intended for use as a fuel cell anode;

supplying air to a second surface of the membrane electrode assembly, said second surface intended for use as a fuel cell cathode;

raising the temperature of the membrane electrode assembly to a temperature of from about 60° C. to about 100° C.; and drawing an electrical current of 150 $mA/cm^2$ through the membrane electrode assembly having a polarity opposite to that in a functioning direct methanol fuel cell for a period of from about 1 minute to about 120 minutes, wherein surface oxides present on the catalyst on the first surface are reduced.

14. The method of claim 13, wherein the step of drawing an electrical current of 150 $mA/cm^2$ through the membrane electrode assembly having a polarity opposite to that in a functioning direct methanol fuel cell is conducted for a period of from about 15 minutes to about 60 minutes.

* * * * *